US009947424B2

(12) United States Patent
Sano et al.

(10) Patent No.: US 9,947,424 B2
(45) Date of Patent: Apr. 17, 2018

(54) COATING TYPE RADIATION-SHIELDING MATERIAL AND RADIATION-SHIELDING ELASTOMER MATERIAL

(71) Applicants: D&D CORPORATION, Yokkaichi-shi, Mie (JP); RICANAL CORPORATION, Osaka-shi, Osaka (JP)

(72) Inventors: Katsuhiko Sano, Yokkaichi (JP); Shigekazu Mizukoshi, Yokkaichi (JP); Isamu Takeuchi, Osaka (JP); Yuji Ishida, Osaka (JP); Yukou Kurimoto, Osaka (JP); Takayoshi Fujino, Ikoma (JP)

(73) Assignees: D&D CORPORATION, Yokkaichi-shi, Mie (JP); RICANAL CORPORATION, Osaka-shi, Osaka (JP)

( * ) Notice: Subject to any disclaimer, the term of this patent is extended or adjusted under 35 U.S.C. 154(b) by 0 days.

(21) Appl. No.: 14/778,393

(22) PCT Filed: Mar. 18, 2014

(86) PCT No.: PCT/JP2014/057268

§ 371 (c)(1),
(2) Date: Sep. 18, 2015

(87) PCT Pub. No.: WO2014/148466

PCT Pub. Date: Sep. 25, 2014

(65) Prior Publication Data

US 2016/0284430 A1 Sep. 29, 2016

(30) Foreign Application Priority Data

Mar. 19, 2013 (JP) ................................ 2013-057034

(51) Int. Cl.

| | |
|---|---|
| ***G21F 1/10*** | (2006.01) |
| ***G21F 3/00*** | (2006.01) |
| ***C09D 7/12*** | (2006.01) |
| ***C09D 119/00*** | (2006.01) |
| *C08K 3/08* | (2006.01) |
| *C08K 5/098* | (2006.01) |

(52) U.S. Cl.

CPC ........... *G21F 1/106* (2013.01); *C09D 7/1216* (2013.01); *C09D 7/1233* (2013.01); *C09D 119/00* (2013.01); *G21F 3/00* (2013.01); *C08K 3/08* (2013.01); *C08K 5/098* (2013.01); *C08K 2003/0887* (2013.01)

(58) Field of Classification Search

CPC ...................................................... G21F 1/106
USPC ......................................................... 523/136
See application file for complete search history.

(56) References Cited

U.S. PATENT DOCUMENTS

| | | | | |
|---|---|---|---|---|
| 6,261,508 | B1 | 7/2001 | Featherby et al. | |
| 2002/0185614 | A1* | 12/2002 | Joseph | G21F 1/103 250/507.1 |
| 2003/0102463 | A1 | 6/2003 | Smith | |
| 2004/0029998 | A1 | 2/2004 | Tomita et al. | |
| 2004/0147652 | A1 | 7/2004 | Lemer et al. | |
| 2005/0021193 | A1 | 1/2005 | Raimbault et al. | |
| 2008/0085962 | A1* | 4/2008 | Simone | C08K 3/08 524/403 |
| 2010/0102279 | A1* | 4/2010 | Kim | G21F 1/10 252/478 |

FOREIGN PATENT DOCUMENTS

| | | | |
|---|---|---|---|
| JP | S57-172297 | A | 10/1982 |
| JP | H08-201581 | A | 8/1996 |
| JP | H10-153690 | A | 6/1998 |
| JP | 2001-242288 | A | 9/2001 |
| JP | 2002-048892 | A | 2/2002 |
| JP | 2003-004892 | A | 1/2003 |
| JP | 2003-287590 | A | 10/2003 |
| JP | 2006-258459 | A | 9/2006 |
| JP | 2008-175811 | A | 7/2008 |
| JP | 2009-276194 | A | 11/2009 |
| JP | 2011-099791 | A | 5/2011 |
| JP | 2012-230101 | A | 11/2012 |
| JP | 2013-018878 | A | 1/2013 |

* cited by examiner

*Primary Examiner* — David T Karst
(74) *Attorney, Agent, or Firm* — Manabu Kanesaka

(57) ABSTRACT

An object of the invention is to provide a radiation-shielding material that has a high radiation-shielding capability and can be easily coated, molded and sheeted. Metals or the like having a radiation-shielding capability are blended with an elastomer precursor in a high concentration thereby providing a radiation-shielding material that has a higher radiation-shielding capability than ever before and can be easily coated, molded and sheeted in any desired configuration.

6 Claims, No Drawings

COATING TYPE RADIATION-SHIELDING MATERIAL AND RADIATION-SHIELDING ELASTOMER MATERIAL

RELATED APPLICATIONS

The present application is National Phase of International Application No. PCT/JP2014/057268 filed Mar. 18, 2014, and claims priority from Japanese Application No. 2013-057034, filed Mar. 19, 2013, the disclosure of which is hereby incorporated by reference herein in its entirety.

TECHNICAL ART

The present invention relates to a coating type radiation-shielding material and a radiation-shielding elastomer material obtained by curing this material.

BACKGROUND ART

Various shields have recently been developed for the purpose of preventing radiation exposures resulting from leading-edge radiotherapeutics, plant sites making use of atomic power such as atomic power generation sites, and radioactive waste discharged from them; however, there is still much left to be desired in terms of the ability of radiation-shielding materials to shield off radiations, materials themselves, production processes, etc.

Radiations are largely broken down to particle beams such as α-rays, β-rays and neutron beams and electromagnetic waves such as γ-rays and X-rays. Alpha rays are less penetrating so that they can be shielded off with a single one paper sheet. Beta beams, too, can be shielded off with a few mm-thick aluminum foil. However, γ-rays are more penetrating, and in order to obtain a 90% shielding rate concrete will have to have a thickness of 29 cm and even lead will have to have a thickness of 2.5 cm. Neutron beams are much more penetrating, and they cannot be shielded off without hydrogen atoms contained in water or thick concrete walls.

In most cases, heavy metals such as lead and concretes have often been used so far as such radiation-shielding materials. Lead is harmful upon absorbed in human bodies, and must be handled pursuant to strict regulations prescribed in the Ordinance on Prevention of Lead Poisoning. Lead must also be disposed under the category of specific hazardous industrial waste while mounting environmental, cost and other problems are taken into consideration.

As disclosed in Patent Publications 1 and 2 and described in Non-Patent Publication 1, concrete must have an increased thickness so as to obtain high shielding rates. Although concrete does not give rise to any problem with fixed structures, yet there are some grave problems with vessels of drum can or container size used for storage and transportation of radioactive materials: the amount of radioactive materials filled up in them is limited, and the weight of vessels themselves is too heavy for delivery. In addition, concrete may often crack with the progress of hydration reactions, resulting possibly in a leakage of radioactive material.

On the other hand, iron having a density of 7.8 g/cm$^3$ is lighter in weight than lead having a density of 11.3 g/cm$^3$; in order to obtain a shielding rate of 90% for Cs 137 γ-rays, however, at least 75 mm thickness is required as compared with 25 mm thickness for lead or the weight is twice as large as lead. Iron cannot thus provide any effective shielding material.

As disclosed in Patent Publications 3, 4, 5 and 6, heavy metals such as tungsten, an alternative to lead, are often kneaded with resins for sheeting. For instance, heavy metals may be milled with thermoplastic resins using a machine having strong shearing force such as a Banbury mixer or a kneader, after which the milled material is extruded through an extruding machine into a sheet product. This radiation-shielding material sheet may be cut depending on the configuration of an application site for use.

As disclosed in Patent Publication 7, a solvent may be used to make the liquid viscosity of a shielding material low enough for cast molding. However, Patent Publication 7 shows that the obtained sheet or molded product has a thickness of 5 mm at most, and says that such sheets may be put one upon another for greater thicknesses. A greater number of sheets will have limited use because of difficulty in retention of shape.

Further, the radiation-shielding rate is greatly affected by the density of the shielding material; so Patent Publications 3 and 4 teach that the packing fraction of heavy metals, etc. is low and, hence, the density of the shielding material is low, too, resulting in a low X-ray shielding rate. However, Patent Publications 5, 6 and 7 show that the packing fraction of heavy metals is increased up to 90% by weight or greater to increase the density of the shielding material up to that of lead, thereby making sure of the shielding rate comparable to that of lead.

PRIOR ART PUBLICATIONS

Patent Publications

Patent Publication 1: JP(A) 10-153690
Patent Publication 2: JP(A) 2009-276194
Patent Publication 3: JP(A) 2013-18878
Patent Publication 4: JP(A) 2011-99791
Patent Publication 5: JP(A) 2008-175811
Patent Publication 6: JP(A) 2006-258459
Patent Publication 7: JP(A) 2003-287590

Non-Patent Publication

Non-Patent Publication 1: Toda Corporation, "Development of radioactive waste storage container while taking into account movement capable of enhancing shielding function and Shielding Capability Experiments", The Internet: www.toda.co.jp/Lucubration/pdf/v598.pdf

SUMMARY OF THE INVENTION

Object of the Invention

One object of the invention is to provide a radiation-shielding material that is lighter than iron albeit having a density equivalent to that of iron and has a high shielding rate equivalent to that of lead, and that can be coated or cast molded into an elastic coating film layer having a thickness of greater than 10 cm. The shielding material of the invention may also be processed into a thick-film layer sheet.

Means for Achieving the Object

According to the invention, the aforesaid object is achievable by blending an elastomer precursor having a liquid viscosity of 10 to 1,000 mPa·s as an example with a tungsten powder having a high radiation-shielding power in a high concentration, agitating the blend by a disper at high speed while holding the blend at 50 to 80° C. to obtain a low viscous liquid of 4,000 to 20,000 mPa·s, and processing the low viscous liquid by coating or cast molding in any desired configuration so that an elastic thin-film layer of about 50 μm to an elastic thick-film layer of greater than 10 cm can be obtained.

A shielding material liquid obtained by evaporation of a small amount of a solvent contained in the aforesaid radiation-shielding material and having a high viscosity as high as 50,000 to 100,000 mPa·s may be processed into 0.5 to 1-mm thick sheets that are then laminated and hot-pressed together to obtain a sheet of as thick as about 10 mm or less.

More specifically, the invention is embodied as follows.

[1] A coating type radiation-shielding material, characterized by comprising a tungsten power, an elastomer precursor and a lithium compound.

[2] The radiation-shielding material as recited in [1], characterized in that said elastomer precursor may be further subjected to a curing reaction such as cross-linking in such a way as to have a solid matter content of 50 to 100 wt % and a viscosity of 10 to 1,000 mPa·s.

[3] The radiation-shielding material as recited in [1], characterized in that said tungsten powder and said elastomer precursor are blended in a blending ratio of 5:95 to 20:80 (parts by weight) as calculated on solid basis.

[4] The radiation-shielding material as recited in [1], characterized in that said lithium compound is blended in an amount of 0.1 to 2.0 parts by weight per 100 parts by weight of said elastomer precursor and said tungsten powder.

[5] The radiation-shielding material as recited in any one of [1] to [4], characterized by further containing a strontium compound, a magnesium compound, and a lanthanide element compound such as a europium compound, an erbium compound and a dysprosium compound alone or in mixed combinations of two or more.

[6] The coating type radiation-shielding material as recited in any one of [1] to [5], characterized by further containing (1) a boron powder or a boron compound powder, or (2) a ferrite powder.

[7] The coating type radiation-shielding material as recited in any one of [1] to [5], characterized by further containing (1) a boron powder or a boron compound powder, and (2) a ferrite powder.

[8] A radiation-shielding elastomer material, characterized by being obtained by coating and curing of the coating type radiation-shielding material as recited in any one of [1] to [7] on a substrate surface.

The radiation-shielding material of the invention may be crosslinked or otherwise cured at room temperature and by heating, providing a cured radiation-shielding material having elasticity. The cured material is resistant to impacts because of having elasticity, and there is no cracking even when it is processed into a thick film layer. If processed into a thin film layer, the cured material may be sewed or otherwise processed.

Advantages of the Invention

According to the invention, it is possible to provide a coating or cast molding type radiation-shielding material of which a cured shielding material having a high radiation shielding rate compared to that of lead albeit having a density comparable to that of iron may be formed in any desired form and in any desired thickness as well as a radiation-shielding material that may be processed into sheets. It is thus possible to reduce the weights of radioactive waste delivery containers, radioactive waste storage containers, and existing and new structures and buildings to be shielded off from radiations, and radiation-shielding protective clothing while keeping high radiation-shielding rates.

MODES FOR CARRYING OUT THE INVENTION

This invention will now be explained in further details.

This invention has features of blending a tungsten powder or the like with an elastomer precursor having a liquid property in high concentrations to make the density of a shielding material high and the radiation-shielding rate high. The shielding material may also be cured or otherwise crosslinked after coating operation into a coating film layer while it may still be coated, cast molded or sheeted. Addition of the lithium compound or the like to the shielding material makes sure a coating radiation-shielding material with or without being cured, which material is further improved in terms of radiation-shielding rate.

The elastomer precursor that is cured as by cross-linking reactions after coating has a solid content (residues remaining after a 3-hour heating at 105° C.) of preferably 30 to 100% by weight, and more preferably 50 to 100% by weight. As the solid content is lower than 30% by weight, more volatile components are left in the shielding material to cause more voids to remain in the cured product after evaporation, resulting in a drop of shielding rate. In a lower solid content it is required to increase the amount of the elastomer precursor to be added for the purpose of making sure of the solid content necessary for high-concentration incorporation of tungsten powders with the result that the viscosity gets too low, leading possibly to sedimentation and separation of tungsten.

The aforesaid elastomer precursor has a viscosity of preferably 1 to 2,000 mPa·s, and more preferably 10 to 1,000 mPa·s. In a viscosity of lower than 1 mPa·s, the viscosity of the shielding material gets too low, leading possibly to sedimentation and separation of tungsten powders. In a viscosity of greater than 2,000 mPa·s, on the other hand, high-concentration incorporation of the tungsten powders becomes difficult, and the viscosity of the shielding material grows too high for coating as well.

In the invention, the mixing ratio of the elastomer precursor and tungsten powders is preferably 3:97 to 25:75, and more preferably 5:95 to 20:80 on weight basis. In a mixing ratio of lower than 3:97, it is difficult to form a sound film layer by coating, and the coating film layer run out of adhesion and strength. In a mixing ratio of greater than 25:75, on the other hand, the density of the shielding material gets low, failing to make sure of high radiation-shielding rates.

The aforesaid elastomer precursor includes, but is not limited to, thermosetting elastomers such as natural or synthetic rubber before crosslinking reactions, for instance, acrylic rubber, nitrile rubber, isoprene rubber, urethane rubber, ethylene propylene rubber, chloro-sulfonated polyethylene rubber, epichlorohydrin rubber, chloroprene rubber, silicone rubber, styrene.butadiene rubber, fluororubber, and polyisobutylene rubber. Thermoplastic elastomers such as those based on styrene, olefin, vinyl chloride, urethane, ester and amide may also be used.

The aforesaid tungsten powders have an average particle diameter of preferably 0.5 to 10 μm, and more preferably 1 to 5 μm. In an average particle diameter of less than 0.5 μm, a greater amount of the elastomer precursor must be used in order to obtain a coating type shielding material, rendering high-concentration incorporation of tungsten difficult. In an average particle diameter of greater than 10 μm, on the other hand, tungsten powders are likely to settle down, rendering the resultant shielding material less fit for a coating type one.

The aforesaid lithium compound includes, but is not limited to, lithium chloride, lithium fluoride, lithium bromide, lithium iodide, lithium hydroxide, lithium hexafluorophosphate, lithium niobate, n-butyl lithium, lithium carbonate, lithium acetate and lithium citrate.

These lithium compounds are used in an amount of preferably 0.1 to 3.0 parts by weight, and more preferably 0.2 to 1.0 parts by weight per a total of 100 parts by weight of the elastomer precursor and tungsten powders. In an amount of less than 0.1 part by weight, they do not contribute to improvements in the radiation-shielding rate, and in an amount of greater than 3.0 parts by weight, there is an increase in the amount of a solvent used for dissolution of the lithium compound. This in turn causes the liquid viscosity of the radiation-shielding material to drop, resulting possibly in sedimentation and separation of tungsten powders, and evaporation of a large amount of the solvent which in turn causes pinholes to occur in the coating film layer, leading to uneven radiation shielding.

In addition to the aforesaid components, a strontium compound, a magnesium compound, and a lanthanide element compound such as a europium compound, an erbium compound and a dysprosium compound may be used alone or in mixed combinations of two or more to improve the radiation-shielding rate. Specifically, strontium carbonate, magnesium oxide, europium oxide, erbium oxide and dysprosium oxide may be used alone or in mixed combinations of two or more.

These compounds may be used in an amount of preferably 0.5 to 5.0 parts by weight, and more preferably 1.0 to 3.0 parts by weight per a total of 100 parts by weight of the elastomer precursor and tungsten powders. In an amount of less than 0.5 parts by weight, there is no improvement in the radiation-shielding rate, and in an amount of greater than 5.0 parts by weight, there is no or little effect on improvements in the radiation-shielding rate due to an increased amount.

Furthermore, other compounds capable of shielding off radiations such as boron, boron compounds, molybdenum and silver may be used not only in powdery or spherical form but also in scaly, acicular or fibrous form.

With the coating or cast molding type radiation-shielding material according to the invention, it is possible to prepare cured radiation-shielding materials in various forms and thicknesses. They may be used in radiation-shielding chambers for making sure of a working space in radiation environments, for storage and delivery vessels for waste materials containing radioactive substances, for protective clothing or equipments for prevention of exposure in radiation environments including medical sites.

How to Provide a Solution to Problems with Shielding Panels and Prefabricated Type Container Material The radiation-shielding material of the invention is coated on rectangular flat and/or channel steels to make shielding panels, which may then be assembled to a prefabricated container or shielding wall capable of making sure of high radiation-shielding rates. The container may also be designed to have a double structure in which the shielding material is cast between its inside and an outer container to make a shielding container or panel having any desired shielding rate. The shielding material may further be sheeted and cut in any desired configuration for application to a steel or other substrate to make a shielding wall or the like.

EXAMPLES

The invention is now explained more specifically with reference to examples.

Raw Materials Used

Elastomer Precursor

One-pack type RTV rubber: Room temperature curing type silicone rubber KE-4895-T made by the Shin-Etsu (hereinafter called KE4895) and having a viscosity of 500 mPa·s Tungsten Powders Tungsten powders C20 made by Allied Material Co., Ltd. (hereinafter called C20)

Lithium Compounds

Lithium acetate: Lithium acetate made by Wako Pure Chemical Industries, Ltd. (hereinafter called lithium acetate)

Lithium citrate: Lithium citrate made by Wako Pure Chemical Industries, Ltd. (hereinafter called lithium citrate)

Strontium Carbonate, Europium Oxide, Erbium Oxide, Dysprosium Oxide

Strontium carbonate, europium oxide, erbium oxide, dysprosium oxide, all made by Wuxi Decorative Products, Co., Ltd. (hereinafter called strontium carbonate, europium oxide, erbium oxide, and dysprosium oxide)

Estimation Testing

The radiation-shielding material prepared according to the invention was cast into an acrylic box having a constant-height side wall and a bottom plate of 5 mm in thickness and allowed to stand alone at normal temperature for 24 hours to obtain a cured radiation-shielding material having varying thicknesses. The γ-ray shielding rate of the cured material was measured using a cesium 137 radiation source No. 8101.10MBq.

Example 1

Using T.K. Homodisper Model 12.5 made by PRIMIX Co., Ltd. (commonly named as Labodisper), 2.0 parts by weight of a lithium acetate solution obtained by dissolving 0.4 part by weight of lithium acetate in 1.6 parts by weight of methanol and 4.0 parts by weight of toluene were added to 8.0 parts by weight of KE4895, and agitated at 1,000 rpm for about 15 minutes. Then, the Labodisper vessel was placed in a water bath held at 70° C., and 92.0 parts by weight of C20 were slowly added to the vessel and agitated at an agitation speed increased up to 3,000 rpm for about 30 minutes while the solution temperature was held at 70° C. Then, the solution was cooled down near to normal temperature. Then, 0.2 parts by weight of pure water were added to the solution and they were mixed and agitated for 5 minute to prepare a radiation-shielding material. The radiation-shielding material was found to have a viscosity of 6,000 mPa·s, and the cured radiation-shielding material obtained from this shielding material was found to have a density of 7.8 g/cm$^3$. The results of estimation of the γ-ray shielding rate of this cured radiation-shield material are set out in Table 1.

TABLE 1

| Thickness of the Cured Material (mm) | γ-Ray Shielding Rate (%) |
|---|---|
| 1 | 10.0 |
| 2 | 16.6 |
| 5 | 25.7 |
| 10 | 45.0 |
| 15 | 57.7 |
| 20 | 66.5 |
| 25 | 75.7 |
| 30 | 81.7 |
| 40 | 89.1 |
| 50 | 93.7 |

| Thickness of the Cured | γ-Ray Shielding Rate (%) Reported in Prior Art | |
|---|---|---|
| Material (mm) | Iron | Lead |
| 1 | — | — |
| 2 | — | 15.4 |
| 5 | 6.6 | 35.0 |
| 10 | 14.2 | 59.5 |
| 15 | — | — |
| 20 | 32.2 | 85.4 |
| 25 | — | — |
| 30 | — | 95.0 |
| 40 | — | 96.3 |
| 50 | 75.2 | 99.4 |

Example 2

Example 1 was repeated with the exception that lithium citrate was used as the lithium compound to obtain a cured shielding material (having a density of 7.8 g/cm$^3$). This cured shielding material was used to carry out the same estimation testing as in Example 1. The results are set out in Table 2.

TABLE 2

| | Thickness of the Cured Material (mm) | | | |
|---|---|---|---|---|
| | 10 | 20 | 30 | 40 |
| γ-Ray Shielding Rate (%) | 44.8 | 66.6 | 81.5 | 89.2 |

Example 3

Example 1 was repeated with the exception that the lithium compound was not added to obtain a cured shielding material (having a density of 7.8 g/cm$^3$). This cured shielding material was used to carry out the same estimation testing as in Example 1. The results are set out in Table 3.

TABLE 3

| | Thickness of the Cured Material (mm) | | | |
|---|---|---|---|---|
| | 10 | 20 | 30 | 40 |
| γ-Ray Shielding Rate (%) | 18.8 | 42.2 | 59.6 | 71.0 |

Example 4

Example 1 was repeated with the exception that the addition of 2.0 parts by weight of lithium acetate in a methanol solution was followed by the addition of strontium carbonate, europium oxide, erbium oxide and dysprosium oxide to obtain a cured shielding material of 5 mm in thickness. This cured shielding material was used to carry out the same estimation testing as in Example 1. The results are set out in Table 4 together with the results of measurement of γ-ray shielding rate using cobalt 60 radiation source No. 2225.

TABLE 4

| | Additives (% by weight) | | | | |
|---|---|---|---|---|---|
| Example | $SrCO_3$ | $Eu_2O_3$ | $Er_2O_3$ | $Dy_2O_3$ | Total |
| 4-0 | 0 | 0 | 0 | 0 | 0 |
| 4-1 | 1.0 | 0 | 0 | 0 | 1.0 |
| 4-2 | 0 | 1.0 | 0 | 0 | 1.0 |
| 4-3 | 0 | 0 | 1.0 | 0 | 1.0 |
| 4-4 | 0 | 0 | 0.5 | 0 | 0.5 |
| 4-5 | 0 | 0 | 0 | 1.0 | 1.0 |
| 4-6 | 0 | 1.0 | 0 | 1.0 | 2.0 |
| 4-7 | 0 | 1.5 | 0 | 1.5 | 3.0 |

| | Shielding Rate | |
|---|---|---|
| Example | Cs-137 Radiation Source | Co-60 Radiation Source |
| 4-0 | 25.7 | 12.0 |
| 4-1 | 25.0 | 12.5 |
| 4-2 | 25.7 | 17.0 |
| 4-3 | 26.2 | 14.6 |
| 4-4 | 26.2 | 15.6 |
| 4-5 | 25.6 | 13.0 |
| 4-6 | 25.8 | 20.7 |
| 4-7 | 25.7 | 21.4 |

Example 5

A radiation-shielding material prepared as in Example 1 was cast molded in a steel box having a constant-height side wall and a bottom plate of 12 mm in thickness, and the same estimation testing as in Example 1 was carried out. The results are set out in Table 5.

TABLE 5

| Thickness of the | γ-Ray Shielding | γ-Ray Shielding Rate Reported in Prior Art | |
|---|---|---|---|
| Cured Material (mm) | Rate (%) | Iron | Lead |
| 15 | 77.9 | — | — |
| 20 | 82.9 | 32.2 | 8.54 |
| 25 | 86.8 | — | — |
| 30 | 90.0 | — | 95.0 |

What is claimed is:

1. A coating type radiation-shielding material, comprising:

a tungsten powder having an average particle diameter of 0.5-10 μm;

an elastomer precursor; and a lithium compound, wherein said elastomer precursor and said tungsten powder are blended in a blending rate of 5:95 to 20:80 as calculated on solid basis, said lithium compound is blended in an amount of 0.1 to 2.0 parts by weight per 100 parts by weight of a mixture of said elastomer precursor and said tungsten powder, and said elastomer precursor has a viscosity of 10 to 1,000 mPa·s at room temperature and is able to be subjected to a curing reaction including cross-linking in such a way as to have a solid matter content of 50 to 100 wt %.

2. The coating type radiation-shielding material as recited in claim 1, wherein the coating type radiation-shielding material further comprises a strontium compound, a magnesium compound, a lanthanide element compound, or a mixture thereof.

3. The coating type radiation-shielding material as recited in claim 1, wherein the coating type radiation-shielding material further comprises (1) a boron powder or a boron compound powder, or (2) a ferrite powder.

4. The coating type radiation-shielding material as recited in claim 1, wherein the coating type radiation-shielding material further comprises (1) a boron powder or a boron compound powder, and (2) a ferrite powder.

5. A radiation-shielding elastomer material, comprising:

a substrate; and the coating type radiation-shielding material as recited in claim 1 on a surface of the substrate.

6. The coating type radiation-shielding material as recited in claim 1, wherein the elastomer precursor is acrylic rubber, nitrile rubber, isoprene rubber, urethane rubber, ethylene propylene rubber, chloro-sulfonated polyethylene rubber, epichlorohydrin rubber, chloroprene rubber, silicone rubber, styrene·butadiene rubber, fluororubber, polyisobutylene rubber, styrene-based thermoplastic elastomer, olefin-based thermoplastic elastomer, vinyl chloride-based thermoplastic elastomer, urethane-based thermoplastic elastomer, ester-based thermoplastic elastomer, or amide-based thermoplastic elastomer.

* * * * *